(12) United States Patent
Taya et al.

(10) Patent No.: US 12,015,337 B2
(45) Date of Patent: Jun. 18, 2024

(54) BUS BAR MODULE

(71) Applicant: Mitsubishi Electric Corporation, Tokyo (JP)

(72) Inventors: Masaki Taya, Tokyo (JP); Hiroki Katsube, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 338 days.

(21) Appl. No.: 17/432,983

(22) PCT Filed: Sep. 13, 2019

(86) PCT No.: PCT/JP2019/036065
§ 371 (c)(1),
(2) Date: Aug. 23, 2021

(87) PCT Pub. No.: WO2020/217565
PCT Pub. Date: Oct. 29, 2020

(65) Prior Publication Data
US 2022/0173583 A1 Jun. 2, 2022

(30) Foreign Application Priority Data
Apr. 22, 2019 (JP) .................................. 2019-080717

(51) Int. Cl.
*H02G 5/00* (2006.01)
*H02M 3/00* (2006.01)

(52) U.S. Cl.
CPC ............ *H02M 3/003* (2021.05); *H02G 5/005* (2013.01)

(58) Field of Classification Search
CPC ......... H02G 5/005; H02G 5/00; H02M 3/003; H02M 7/003; H01G 2/04; H01G 2/10;
(Continued)

(56) References Cited

U.S. PATENT DOCUMENTS 3,104,276 A 9/1963 Cataldo et al.
2010/0132193 A1 6/2010 Yoshinaga et al.
(Continued)

FOREIGN PATENT DOCUMENTS

CN 106971992 A 7/2017
CN 107769133 A 3/2018
(Continued)

OTHER PUBLICATIONS

Extended European Search Report dated May 3, 2022 in European Application No. 19926427.6.
(Continued)

*Primary Examiner* — Timothy J Thompson
*Assistant Examiner* — Guillermo J Egoavil
(74) *Attorney, Agent, or Firm* — Sughrue Mion, PLLC; Richard C. Turner

(57) ABSTRACT

An object herein is to provide a bus bar module which is highly reliable in insulation performance, by reducing stresses imposed on its spacer to thereby suppress deterioration in the insulation property thereof. The bus bar module includes: a bus bar having a hole in its parallel planar region and made of an electrically conductive material; a bus bar opposed to the bus bar, having a hole in its parallel planar region and at a position corresponding to the hole, and made of an electrically conductive material; a spacer made of an insulating material, which is sandwiched between the bus bars, and in which a hole is provided so as to overlap with the hole and the hole; and a resin mold covering these bus bars and the spacer; wherein a through-hole that is established by the holes, is filled with a portion of the resin mold.

20 Claims, 11 Drawing Sheets

(58) Field of Classification Search
CPC .......... H01G 2/106; H01G 4/18; H01G 4/224;
H01G 4/228; H01G 4/38
USPC ........................................ 174/68.2; 361/328
See application file for complete search history.

(56) References Cited

U.S. PATENT DOCUMENTS

| | | | |
|---|---|---|---|
| 2011/0127061 A1 | 6/2011 | Gotou | |
| 2018/0233285 A1* | 8/2018 | Sato | ................. H01G 4/18 |
| 2019/0304621 A1 | 10/2019 | Velthuis et al. | |
| 2019/0305447 A1 | 10/2019 | Velthuis et al. | |
| 2019/0305526 A1 | 10/2019 | Velthuis et al. | |

FOREIGN PATENT DOCUMENTS

| | | | |
|---|---|---|---|
| CN | 108352252 A | 7/2018 | |
| JP | 56-110584 U | 8/1981 | |
| JP | 09-161890 A | 6/1997 | |
| JP | 2004303942 A * | 10/2004 | ............... H01G 4/18 |
| JP | 2008-181979 A | 8/2008 | |
| JP | 2011-134791 A | 7/2011 | |
| JP | 2012-056118 A | 3/2012 | |
| JP | 2012-105382 A | 5/2012 | |
| JP | 2015-005573 A | 1/2015 | |
| JP | 2016-012965 A | 1/2016 | |
| WO | 2017-081853 A1 | 5/2017 | |
| WO | 2018/114687 A1 | 6/2018 | |

OTHER PUBLICATIONS

International Search Report for PCT/JP2019/036065 dated Oct. 15, 2019 (PCT/ISA/210).
Communication dated Jun. 12, 2023, issued in European Application No. 19 926 427.6.
Office Action dated Nov. 21, 2023 in Chinese Application No. 201980095441.5.
Chinese Office Action dated Apr. 22, 2024 in Application No. 201980095441.5.

* cited by examiner

BUS BAR MODULE

CROSS REFERENCE TO RELATED APPLICATIONS

This application is a National Stage of International Application No. PCT/JP2019/036065 filed Sep. 13, 2019, claiming priority based on Japanese Patent Application No. 2019-080717 filed Apr. 22, 2019.

TECHNICAL FIELD

The present application relates to a bus bar module.

BACKGROUND ART

In hybrid vehicles and electric vehicles, power conversion devices are employed which perform power conversion using semiconductor modules. As such a power conversion device in Patent Document 1, an example is disclosed which is provided with multiple semiconductor modules for converting power and a bus bar module that is electrically connected to the power terminals of the respective semiconductor modules. The bus bar module has multiple bus bars each made of a conductor. The multiple bus bars are electrically connected, at their respective one end portions, to the power terminals of the respective semiconductor modules. Further, the other end portions of the bus bars are electrically connected to the respective phase terminals of a motor. The bus bars are each formed into a rectangular and flat-shaped cross section, and form parallel plates.

Here, in the semiconductor module, a semiconductor switching element is incorporated, which serves as a power switch for turning ON/OFF a high voltage and a large amount of current. The potential at each of the bus bars is the same as the potential at the output terminal of each of the semiconductor modules, so that a potential difference corresponding to an AC or DC high voltage may be generated between the respective bus bars. Thus, it is necessary to ensure insulation between the bus bars.

In this regard, in Patent Document 1, a structure is disclosed in which the multiple bus bars are encapsulated with an encapsulation resin having an insulation property, so that they are formed into a bus bar module. The power conversion device for in-vehicle use is required to be made compact since its mountable region inside the vehicle is restricted. Accordingly, it is also necessary to ensure insulation against its surrounding components other than bus bar, such as a control board, a capacitor, a cooler, etc. Thus, it is effective to encapsulate the multiple bus bars entirely with the insulating encapsulation resin. To achieve insulating resin-encapsulation, insert molding using the insulating resin may be employed. The insert molding is advantageous in productivity.

Meanwhile, according to the insert molding, there is a problem that, because the encapsulation is achieved by injecting the insulating resin with a high pressure into a mold in which the multiple bus bars are installed, the bus bar may be deformed due to the pressure for injection, to cause a distance between bus bars to become shorter, resulting in deterioration in insulation performance. To deal with such a problem, in Patent Document 2, a technique is disclosed in which an insulating plate is sandwiched as a spacer between respective bus bars to thereby ensure insulation between the bus bars.

With respect to a power conversion device configured with a semiconductor module and multiple bus bars, when a high-speed switching element, for example, an IGBT (Insulated Gate Bipolar Transistor), a MOSFET (metal-oxide-semiconductor field-effect transistor) or the like is used as a semiconductor element incorporated in the semiconductor module, it is required to reduce interconnection inductance as much as possible to thereby reduce the change rate of a current flowing through the semiconductor switching element.

In order to reduce the interconnection inductance of the bug bars, similarly to the bug bar interconnection shown in Patent Document 2, it is effective to form the multiple bus bars into parallel plates. Furthermore, it is effective to decrease the distance between bus bars and to increase the area of each parallel planar shape. In the parallel planar region, the interconnection inductance becomes smaller as the mutual inductance between the opposing bus bars becomes smaller. Further, when the distance between the bus bars is decreased, the mutual inductance becomes much smaller.

CITATION LIST

Patent Document

Patent Document 1: Japanese Patent Application Laid-open No. 2016-12965 (Paragraphs 0023 to 0024; FIG. 1)
Patent Document 2: Japanese Patent Application Laid-open No. 2012-105382 (Paragraph 0027; FIG. 1)

SUMMARY OF THE INVENTION

Problems to be Solved by the Invention

According to the bus-bar interconnection shown in Patent Document 2, in order to ensure insulation between the bus bars, the insulating spacers sandwiched between bus bars is located so as to entirely cover the parallel planar regions, and the bus bars and the spacers, other than the terminal portions of the bus bars, are entirely covered with the encapsulation resin made of an insulating material; however, although the bus bar and the spacer are in contact with each other, they are not adhered to each other. Accordingly, the contact faces of the bus bar and the spacer are not adhered to each other, while they are both adhered to the encapsulation resin because of being entirely encapsulated with the resin through insert molding or the like. Since a difference in thermal expansion coefficient between the bus bar and the spacer is large, when the conventional bus bar module is exposed in high and low temperature environments, in the bus bar not joined to the spacer, warpage may occur due to a thermal strain difference between them caused by the temperature change. Further, the more the difference in thermal expansion coefficient is, the larger the amount of warpage becomes. In particular, when the area of the parallel planar region is large, the length of the non-adhered region becomes large, and the amount of warpage increases as the length of the non-adhered region becomes larger. Because of the warpage, a gap will be created along the non-adhered region, so that stress concentration may occur on an end portion of the non-adhered region. When the temperature change is repeated, cracking will occur firstly at the stress-concentrated portion of the bus bar. If the temperature change is further repeated, cracking will spread into the spacer. The spread of cracking causes a problem that the insulation property of the spacer is deteriorated, so that the insulation between the bus bars cannot be ensured.

This application discloses a technique for solving a problem as described above, and an object thereof is to suppress deterioration in the insulation property of the spacer by reducing stresses imposed thereon, to thereby provide a bus bar module which is highly reliable in insulation performance.

Means for Solving the Problems

A bus bar module disclosed in this application is characterized by comprising: a first bus bar having a first hole in a planar region thereof and made of an electrically conductive material; a second bus bar opposed to the first bus bar, having a second hole in a planar region thereof and at a position corresponding to the first hole, and made of an electrically conductive material; a spacer made of an insulating material, which is sandwiched between the first bus bar and the second bus bar, and in which a third hole is provided so as to overlap with the first hole and the second hole, and a resin mold covering the first bus bar, the second bus bar and the spacer; wherein a through-hole that, is established by the first hole, the second hole and the third hole, is filled with a portion of the resin mold.

Effect of the Invention

According to this application, because of the provision of the resin mold formed of an encapsulation resin that fills the through-hole established by the holes of the respective bus bars and the hole of the spacer, stressed imposed on the spacer are reduced, so that it is possible to suppress deterioration in the insulation property, to thereby provide a bus bar module which is highly reliable in insulation performance.

MODES FOR CARRYING OUT THE INVENTION

Embodiment 1

Figure 1A:
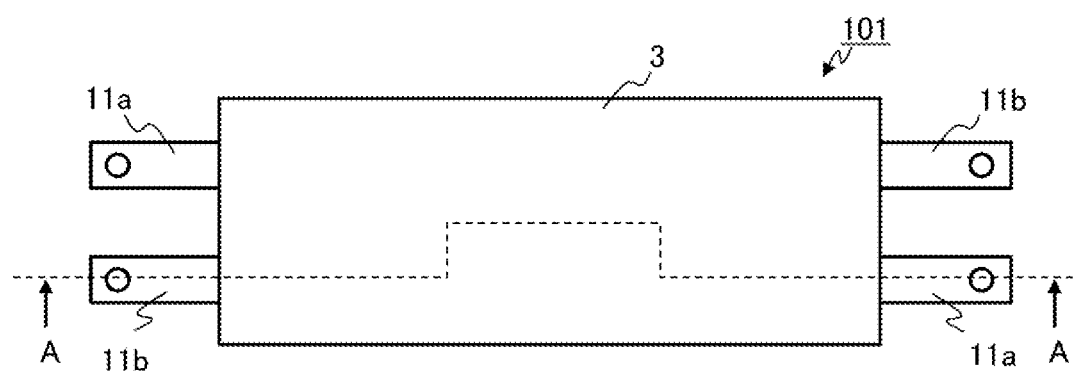
FIG. 1A and FIG. 1B are plan views each showing a configuration of a bus bar module according to Embodiment 1.
Figure 1B:
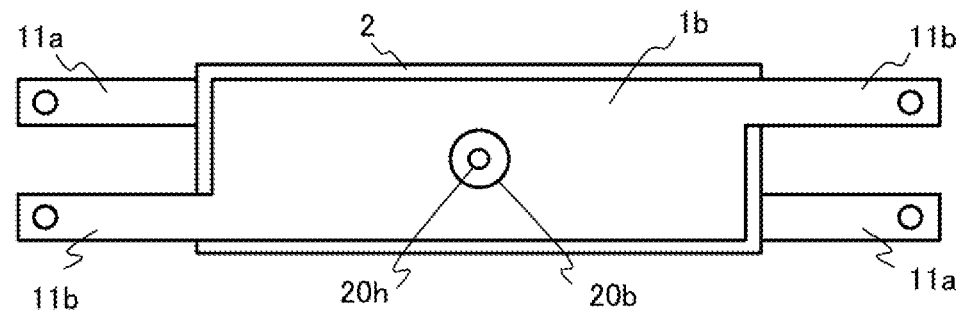
Figure 2:
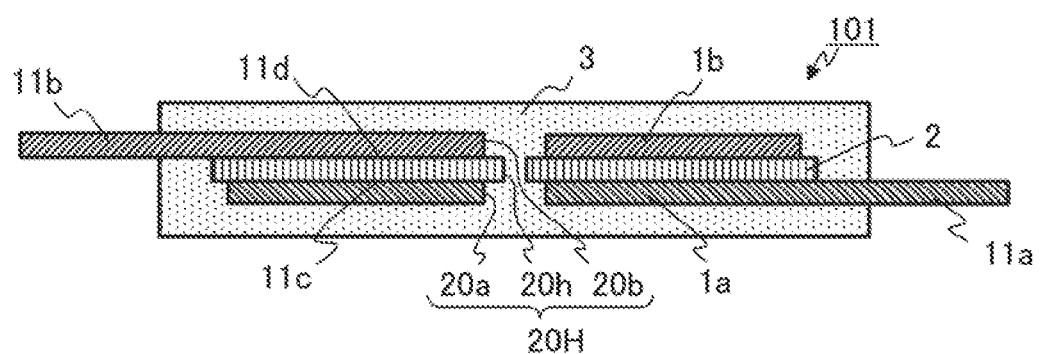
FIG. 2 is sectional view showing a configuration of the bus bar module according to Embodiment 1.

FIG. 1A and FIG. 1B are plan views each showing a configuration of a bus bar module according to Embodiment 1, in which FIG. 1A shows the view after resin-encapsulation and FIG. 1B shows the view before resin-encapsulation. FIG. 2 is a sectional view along arrow AA in FIG. 1A. As shown in FIG. 1A, FIG. 1B and FIG. 2, a bus bar module 101 is configured mainly with: a bus bar 1a as a first bus bar and a bus bar 1b as a second bus bar, which are opposed to each other and each made of an electrically conductive material; a spacer 2 which is sandwiched between the bus bars 1a, 1b and made of an insulating material; and a resin mold 3 formed of an encapsulation resin made of an insulating material that entirely covers the bus bars 1a, 1b and the spacer 2, other than terminal portions 11a, 11b of the bus bars 1a, 1b.

The bus bars 1a, 1b are provided as a positive electrode and a negative electrode so as to be opposed to each other, and in order to ensure insulation between the bus bar 1a and the bus bar 1b, the spacer 2 is sandwiched therebetween so as to entirely cover their respective parallel planar regions 11c, 11d. In the bus bars 1a, 1b, at central portions of the parallel planar regions 11e, 11d, a hole 20a as a first hole and a hole 20b as a second hole, that are mutually corresponding holes, are created, respectively. As a material of each of the bus bars 1a, 1b, usually, Cu, a Cu alloy or the like, that is excellent in electric conductivity and thermal conductivity, is used. Note that, other than this, Al or an Al alloy may be used.

In order to ensure insulation between the bus bar 1a and the bus bar 1b, the spacer 2 is provided so as to entirely cover the parallel planar regions 11c, 11d of the bus bar 1a and the bus bar 1b. In the spacer 2, at its central portion, a hole 20h as a third hole is created so as to overlap with the holes 20a, 20b provided in the parallel planar regions 11c, 11d of the bus bars 1a, 1b. With respect to a power converter for in-vehicle use, as a material of the spacer 2, PPS (Poly Phenylene Sulfide) is used from the viewpoints of structural strength, thermal tolerance, insulation property and productivity. In the case of the spacer 2 made of PPS, it is favorable if its thickness is not less than 1 mm, from the viewpoints of structural strength and insulation property. Furthermore, in order to decrease the mutual inductance between bus bar 1a and the bus bar 1b, it is appropriate if the thickness of the spacer 2 is not more than 1.5 mm. Note that, other than PPS, an insulating resin such as PET (Poly Butylene Terephthalate) or the like, may be used. Further, a thermally-conductive insulating sheet having a high thermal conductivity may instead be used.

The resin mold 3 is formed in such a manner that the bus bar 1a and the bus bar 1b with the spacer 2 sandwiched therebetween, other than the terminal portions 11a, 11b, are entirely covered with the encapsulation resin made of an insulating material, and a through-hole 20H established by the holes 20a, 20b of the respective bus bars 1a, 1b and the hole 20h of the spacer 2 is filled also with that resin. With respect to the power converter for in-vehicle use, PPS is used for the resin mold 3 from the viewpoints of structural strength, thermal tolerance, insulation property and productivity. Note that, other than PPS, an insulating resin used for insert molding, such as PBT or the like, may be used.

A feature of this application resides in that the through-hole 20H established by the holes 20a, 20b of the bus bars 1a, 1b and the hole 20h of the spacer 2 is filled with a portion of the resin mold 3, to thereby adhere each of the bus bar 1a, the bus bar 1b and the spacer 2 to the resin mold 3 even in the through-hole 20H.

Accordingly, the length of each of non-adhered regions between the bus bars 1a, 1b and the spacer 2 along the parallel planar regions 11c, 11d is decreased while keeping the areas of the parallel planar regions 11c, 11d large. This makes it possible to reduce the amount of warpage to thereby suppress the stress concentration, and thus to suppress occurrence of cracking to thereby achieve improvement in the insulation performance. Further, because their fixed position is established, there is also provided an effect that the quake resistance is improved.

It is noted that, in Embodiment 1, the through-hole 20H is positioned in the central portions of the parallel planar regions 11c, 11d; however, this is not limitative, and it only has to be placed in the parallel planar regions 11c, 11d of the bus bars 1a, 1b.

Next, a manufacturing method of the bus bar module 101 according to Embodiment 1 to be provided as a power semiconductor device, will be described based on FIGS. 3A to 3D. FIGS. 3A to 3D are sectional views showing a manufacturing method of the bus bar module 101 according to Embodiment 1.

Figure 3A:
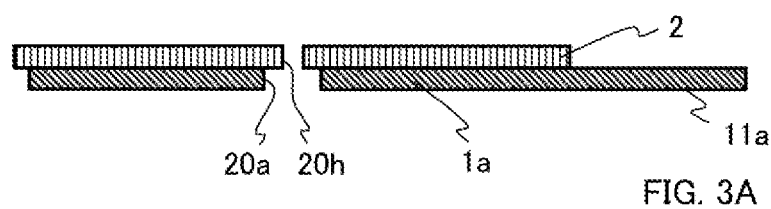
FIGS. 3A to 3D are sectional views showing a manufacturing method of the bus bar module according to Embodiment 1.

First, as shown in FIG. 3A, the spacer 2 is placed on the bus bar 1a. At this time, the positions of the bus bar 1a and the spacer 2 are determined so that the respective central axes of the hole 20a of the bus bar 1a and the hole 20h of the spacer 2 coincide with each other.

Figure 3B:
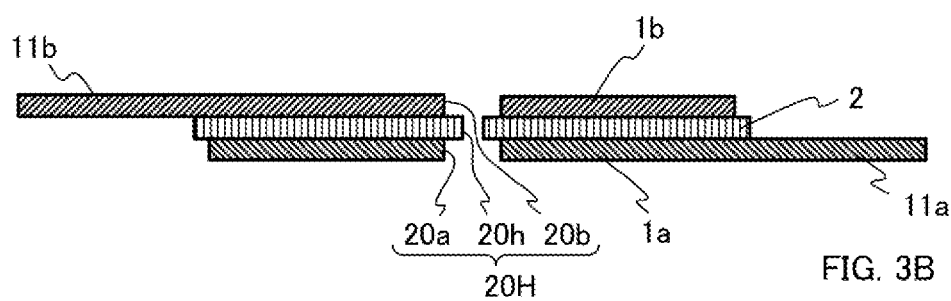

Subsequently, as shown in FIG. 3B, the bus bar 1b is placed on the spacer 2. At this time, the positions of the bus bar 1b and the spacer 2 are determined so that the respective central axes of the hole 20b of the bus bar 1b and the hole 20h of the spacer 2 coincide with each other. As a result, the through-hole 20H is established.

Figure 3C:
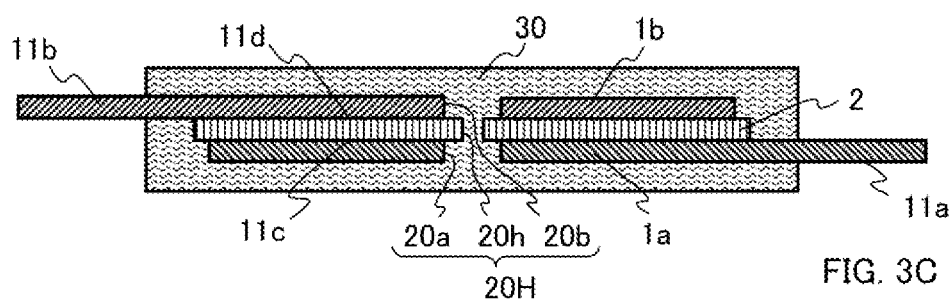

Then, as shown in FIG. 3C, insert molding is carried out by inserting the bus bars 1a, 1b with the spacer 2 sandwiched therebetween, into an unshown mold, and filling a region around the bus bars 1a, 1b with an encapsulation resin 30. At this time, the encapsulation resin 30 is also filled in the through-hole 20H established by the holes 20a, 20b of the bus bars 1a, 1b and the hole 20h of the spacer 2.

Figure 3D:
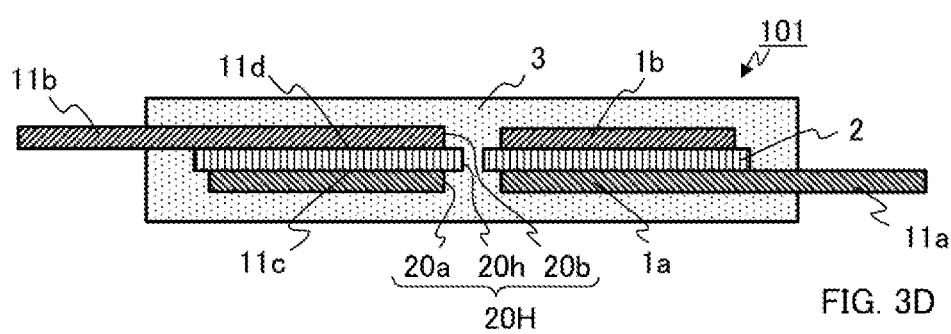

Lastly, as shown in FIG. 3D, the thus-filled encapsulation resin 30 is cured by heating, so that the resin mold 3 is formed which covers the bus bars 1a, 1b with the spacer 2 sandwiched therebetween and a portion of which fills up the through-hole 20H, to thereby provide the bus bar module 101.

In the thus-manufactured bus bar module 101, although the spacer 2 is in contact with each of the bus bars 1a, 1b, they are not adhered to each other. On the other hand, the resin mold 3 is adhered to each of the bus bar 1a, the bus bar 1b and the spacer 2. This is because the bus bar 1a, the bus bar 1b and the spacer 2 is insert-molded in the resin mold 3.

According to the bus bar module 101 of this application, the bus bars 1a, 1b with the spacer 2 sandwiched therebetween are covered with the encapsulation resin 30 and the through-hole 20H established by the holes 20a, 20b of the bus bars 1a, 1b and the hole 20h of the spacer 2 is filled with the encapsulation resin 30, and then the resin mold 3 is formed by heat-curing, so that each of the bus bar 1a, the bus bar 1b and the spacer 2 is adhered to the resin mold 3 even in the through-hole 20H. Accordingly, the length of each of non-adhered regions between the bus bars 1a, 1b and the spacer 2 along the parallel planar regions 11c, 11d is decreased while keeping the areas of the parallel planar regions 11c, 11d large. This makes it possible to reduce the amount of warpage to thereby suppress the stress concentration, and thus to suppress occurrence of cracking to thereby achieve improvement in the insulation performance. Further, because the fixed position is established, there is also provided an effect that the quake resistance is improved.

As described above, the bus bar module 101 according to Embodiment 1 comprises: the bus bar 1a having the hole 20a in the parallel planar region 11c and made of an electrically conductive material; the bus bar 1b opposed to the bus bar 1a, having the hole 20b in the parallel planar region 11d and at a position corresponding to the hole 20a, and made of an electrically conductive material; the spacer 2 made of an insulating material, which is sandwiched between the bus bar 1a and the bus bar 1b, and in which the hole 20h is provided so as to overlap with the hole 20a and the hole 20b; and the resin mold 3 covering the bus bars 1a, 1b and the spacer 2; wherein the through-hole 20H that is established by the hole 20a, the hole 20b and the hole 20h, is filled with a portion of the resin mold 3. Accordingly, the length of each of non-adhered regions between the bus bars and the spacer along the respective parallel planar regions is decreased while keeping the areas of the parallel planar regions large. This makes it possible to reduce the amount of warpage to thereby suppress the stress concentration, and thus to suppress occurrence of cracking to thereby achieve improvement in the insulation performance.

Further, because the fixed position is established, there is also provided an effect that the quake resistance is improved. Furthermore, when the thickness of the bus bar 1a and the thickness of the bus bar 1b are equal to each other, and the thickness of a portion of the resin mold 3 located on the bus bar 1a and the thickness of a portion of the resin mold 3 located on the bus bar 1b are equal to each other, it is possible to suppress unbalance leading to warpage from occurring in the vertical direction. This is effective in making it possible to further mitigate stress concentration on the spacer.

Embodiment 2

In Embodiment 1, a case has been described where the positions of the bus bars 1a, 1b and the spacer 2 are determined so that the central axes of the hole 20a, the hole 20b and the hole 20h coincide with each other, whereas in Embodiment 2, a case will be described where a protrusion portion is provided at a circumferential edge portion of the spacer around the hole thereof.

Figure 4:
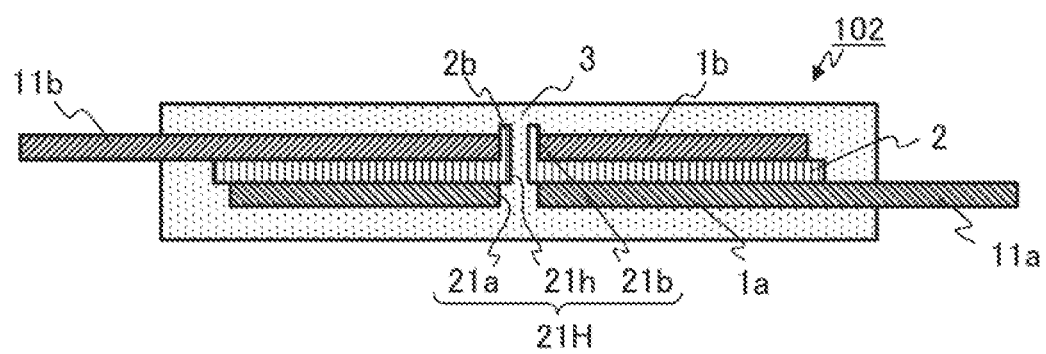
FIG. 4 is a sectional view showing a configuration of a bus bar module according to Embodiment 2.

FIG. 4 is a sectional view showing a configuration of a bus bar module according to Embodiment 2. As shown in FIG. 4, in a bus bar module 102, at a circumferential edge portion of the spacer 2 around a hole 21h being located on a side nearer to the bus bar 1b, a protrusion portion 2b as a first protrusion portion is provided so as to cover the inner wall of a hole 21b of the bus bar 1b.

In a manufacturing method of the bus bar module 102, the protrusion portion 2b of the spacer 2 is formed to be insertable into the hole 21b of the bus bar 1b, so that, at the time of placing the bus bar 1b on the spacer 2, their positions can easily be determined merely by insertion of the protrusion portion 2b into the hole 21b, without depending on a placing operation to be performed so that the central axes of the hole 21b and the hole 21h coincide with each other.

The other configuration and manufacturing method of the bus bar module 102 according to Embodiment 2 are the same as those of the bus bar module 101 of Embodiment 1. Thus, the same reference numerals are given to the equivalent parts, so that description thereof will be omitted.

As described above, according to the bus bar module 102 of Embodiment 2, in the spacer 2, the protrusion portion 2b is provided at its circumferential edge portion around the hole 21h being located on a side nearer to the bus bar 1b, so as to cover the hole 21b. Thus, in the manufacturing method of the bus bar module, the positions can easily be determined merely by insertion of the protrusion portion into the hole of the bus bar, without depending on a placing operation to be performed so that the central axes of the hole of the bus bar and the hole of the spacer coincide with each other.

Figure 5:
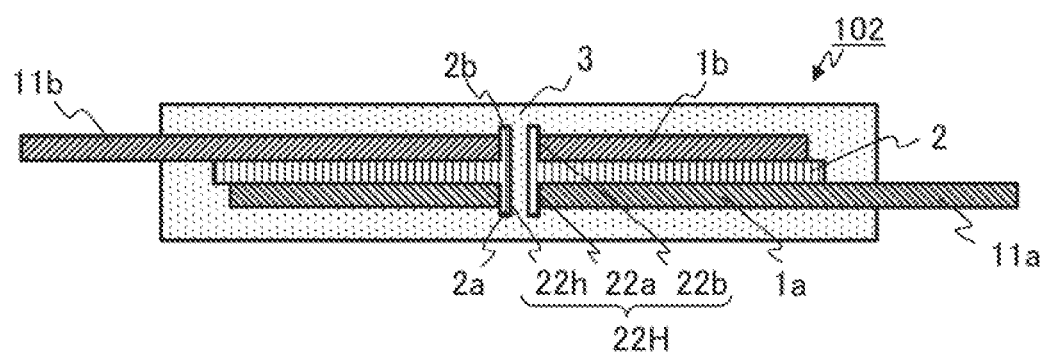
FIG. 5 is a sectional view showing a configuration of another bus bar module according to Embodiment 2.

It is noted that, in Embodiment 2, the protrusion portion 2b is provided at the circumferential edge portion of the spacer 2 around the hole 21h being located on a side nearer to the bus bar 1b; however, this is not limitative. A protrusion portion 2a as a second protrusion portion may be provided at a circumferential edge portion of the spacer 2 around the hole 21h being located on a side nearer to the bus bar 1a, so as to cover the hole 21a, and as shown in FIG. 5, the protrusion portions 2a, 2b may be provided at both the circumferential edge portions of the spacer 2 around the hole 22h that are located on a side nearer to the bus bar 1a and on a side nearer to the bus bar 1b, so as to cover the holes 22a, 22b, respectively. Even in this case, it is possible to achieve an effect that is similar to the effect according to Embodiment 2.

Further, when the protrusion portions 2a, 2b are provided at both the circumferential edge portions of the spacer 2 around the hole 21h that are located on a side nearer to the bus bar 1a and on a side nearer to the bus bar 1b, it is possible to get a large insulation creepage distance between the bus bars, even if the filling efficiency of the encapsulation resin 30 is insufficient in the through-hole. This is effective in making it possible to keep the bus bar module excellent in insulation performance. Furthermore, when the protrusion portions 2a, 2b located on the bus bar 1a-side and on the bus bar 1b-side, have vertically symmetrical shapes and dimensions, it is possible to suppress unbalance leading to warpage from occurring. This is effective in making it possible to further mitigate the stress concentration.

Embodiment 3

In Embodiment 1, a case has been described where the through-hole H filled with a portion of the resin mold 3 is provided at one location in the bus bar module 101, whereas in Embodiment 3, a case will be described where the through-hole filled with a portion of the resin mold is provided at each of multiple location therein.

Figure 6A:
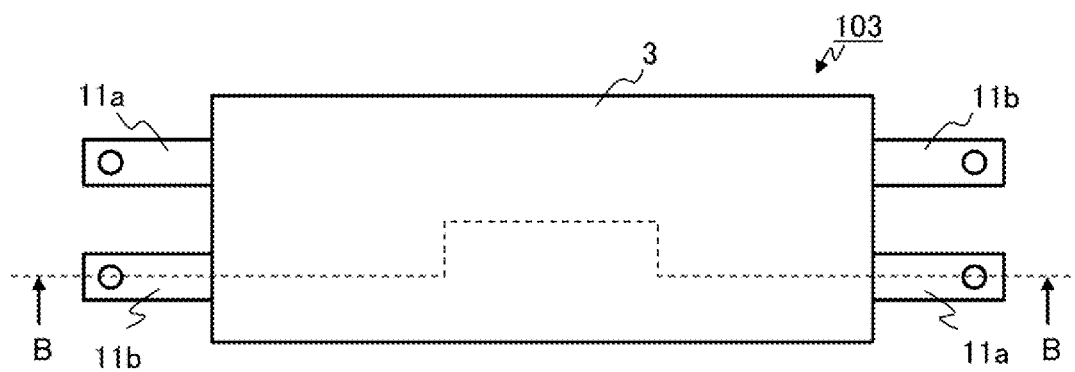
FIG. 6A and FIG. 6B are plan views each showing a configuration of a bus bar module according to Embodiment 3.
Figure 6B:
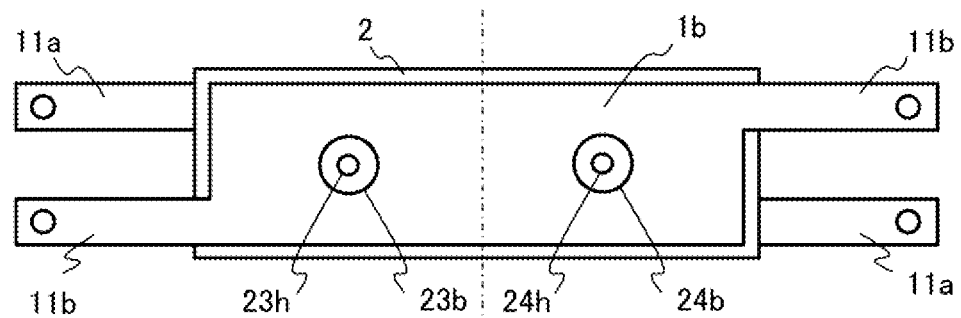
Figure 7:
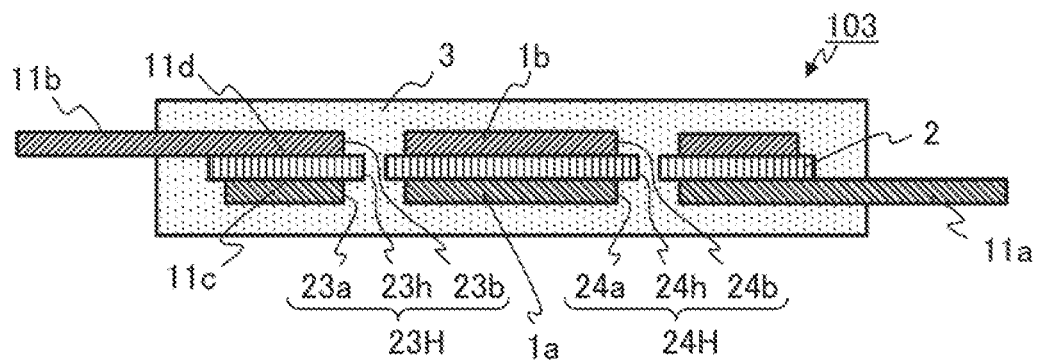
FIG. 7 is a sectional view showing a configuration of the bus bar module according to Embodiment 3.

FIGS. 6A and 6B are plan views each showing a configuration of a bus bar module according to Embodiment 3, in which FIG. 6A shows the view after resin-encapsulation and FIG. 6B shows the view before resin-encapsulation. FIG. 7 is a sectional view along arrow BB in FIG. 6A. As shown in FIG. 6A, FIG. 6B and FIG. 7, a bus bar module 103 has a through-hole 23H (a hole 23a, a hole 23h and a hole 23b) and a through-hole 24H (a hole 24a, a hole 24h and a hole 24b) at two locations corresponding to respective central portions in the bisected regions of the parallel planar regions 11c, 11d of the bus bars 1a, 1b.

In a manufacturing method of the bus bar module 103, at the time of placing the spacer 2 on the bus bar 1a and placing the bus bar 1b on the spacer 2, their positions are determined so that the through-hole 23H and the through-hole 24H are established at the two locations, and then the through-hole 23H and the through-hole 24H are both filled with the encapsulation resin 30.

The other configuration and manufacturing method of the bus bar module 103 according to Embodiment 3 are the same as those of the bus bar module 101 of Embodiment 1. Thus, the same reference numerals are given to the equivalent parts, so that description thereof will be omitted.

Accordingly, the number of the fixed positions increases, so that the length of each of non-adhered regions between the bus bars 1a, 1b and the spacer 2 along the parallel planar regions 11c, 11d is further decreased while keeping the areas of the parallel planar regions 11c, 11d large. This makes it possible to reduce the amount of warpage to thereby suppress the stress concentration, and thus to suppress occurrence of cracking to thereby achieve improvement in the insulation performance, more significantly. Further, because of the increased fixed positions, there is also provided an effect, that the quake resistance is further improved.

It is noted that, in Embodiment 3, the number of the through-holes 23H, 24H is two; however, where necessary, three or more multiple through-holes may instead be provided. Further, the through-holes 23H, 24H are positioned at the two locations corresponding to respective central portions in the bisected regions of the parallel planar regions 11c, 11d; however, they only have to be placed in the parallel planar regions 11c, 11d of the bus bars 1a, 1b.

As described above, the bus bar module 103 according to Embodiment 3 is provided with the multiple through-holes 23H, 24H. Thus, the number of the fixed positions increases, so that the length of each of non-adhered regions between the bus bars and the spacer along the parallel planar regions is further decreased while keeping the areas of the parallel planar regions large. This makes it possible to reduce the amount of wazpage to thereby suppress the stress concentration, and thus to suppress occurrence of cracking to thereby achieve improvement in the insulation performance, more significantly. Further, because of the increased fixed positions, there is also provided an effect that the quake resistance is further improved.

Embodiment 4

In Embodiment 1, a case has been described where the hole 20a, the hole 20b and the hole 20h of the bus bars 1a, 1b and the spacer 2, are mutually overlapped, without modification, to thereby establish the through-hole 20H, whereas in Embodiment 4, a case will be described where a counterbore portion is provided at a circumferential edge portion around the hole.

Figure 8:
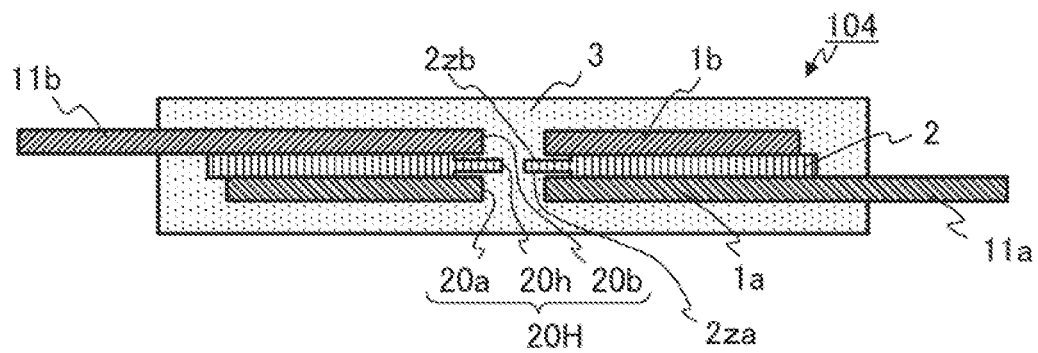
FIG. 8 is a sectional view showing a configuration of a bus bar module according to Embodiment 4.

FIG. 8 is a sectional view showing a configuration of a bus bar module 104 according to Embodiment 4. As shown in FIG. 8, in the bus bar module 104, counterbore portions 2za, 2zb are respectively provided at both circumferential edge portions of the spacer 2 around the hole 20h that are located on a side nearer to the bus bar 1a and on a side nearer to the bus bar 1b, so as to overlap with respective circumferential edge portions of the bus bars 1a, 1b around the holes 20a, 20b.

The other configuration and manufacturing method of the bus bar module 104 according to Embodiment 4 are the same as those of the bus bar module 101 of Embodiment 1. Thus, the same reference numerals are given to the equivalent parts, so that description thereof will be omitted.

Accordingly, the length of each of non-adhered regions between the bus bars 1a, 1b and the spacer 2 along the parallel planar regions 11c, 11a is further decreased while keeping the areas of the parallel planar regions 11c, 11d large. This makes it possible to reduce the amount of warpage to thereby suppress the stress concentration, and thus to suppress occurrence of cracking to thereby achieve improvement in the insulation performance, more significantly.

As described above, according to the bus bar module 104 of Embodiment 4, in the spacer 2, the counterbore portions 2za, 2zb are provided respectively at its both circumferential edge portions around the hole 20h that are located on a side nearer to the bus bar 1a and on a side nearer to the bus bar 1b, so as to overlap with the respective circumferential edge portions around the hole 20a and the hole 20b. Thus, the length of each of non-adhered region between the bus bars and the spacer along the parallel planar regions is further decreased while keeping the areas of the parallel planar regions large. This makes it possible to reduce the amount of warpage to thereby suppress the stress concentration, and thus to suppress occurrence of cracking to thereby achieve improvement in the insulation performance, more significantly.

Figure 9:
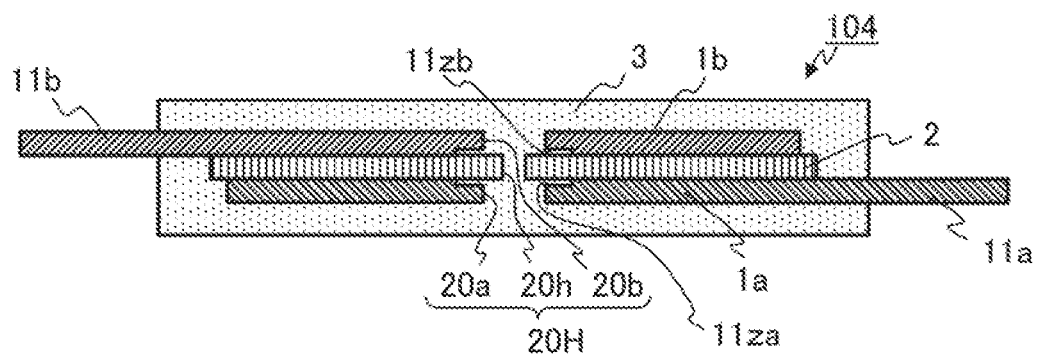
FIG. 9 is a sectional view showing a configuration of another bus bar module according to Embodiment 4.
Figure 10:
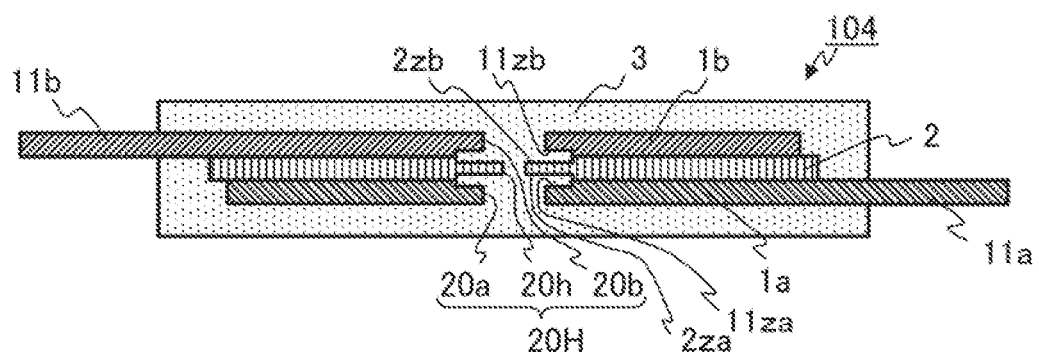
FIG. 10 is a sectional view showing a configuration of another bus bar module according to Embodiment 4.

It is noted that, in Embodiment 4, the counterbore portions 2za, 2zb are provided at both circumferential edge portions of the spacer 2 around the hole 20h; however, this is not limitative. As shown in FIG. 9, counterbore portions 11za, 11zb may be provided at the respective circumferential edge portions of the bus bars 1a, 1b around the holes 20a, 20b, that are each located on a side nearer to the spacer 2, so as to overlap with the respective circumferential edge portions of the spacer 2 around the hole 20h. Further, as shown in FIG. 10, the counterbore portions 2za, 11za and the counterbore portions 2zb, 11ab may be provided, respectively, at both of the respective mutually-corresponding circumferential edge portions of the spacer 2 around the hole 20h and the bus bars 1a, 1b around the holes 20a, 20b. Even in these cases, it is possible to achieve an effect that is similar to the effect according to Embodiment 4.

Embodiment 5

In Embodiment 2, a case has been described where the protrusion portions 2a, 2b are provided at the circumferential edge portions of the spacer 2 around the hole 20h; whereas in Embodiment 5, a case will be described where a protrusion portion is further provided at an outer peripheral portion of the spacer.

Figure 11:
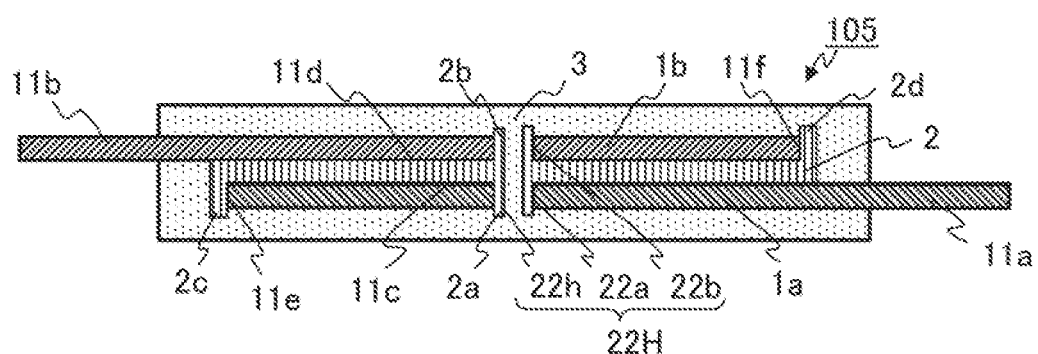
FIG. 11 is a sectional view showing a configuration of a bus bar module according to Embodiment 5.

FIG. 11 is a sectional view showing a configuration of a bus bar module 105 according to Embodiment 5. As shown in FIG. 11, in the bus bar module 105, not only that the protrusion portions 2a, 2b are provided respectively at both circumferential edge portions of the spacer 2 that are located on a side nearer to the bus bar 1a and on a side nearer to the bus bar 1b; but also that a protrusion portion 2c as a third protrusion portion and a protrusion portion 2d as a fourth protrusion portion are provided respectively at outer peripheral portions of the spacer 2 so as to cover an end portion 11e of the bus bar 1a with respect to the parallel planar region lie and an end portion 11f of the bus bar 1b with respect to the parallel planar region 11d.

The other configuration and manufacturing method of the bus bar module 105 according to Embodiment 5 are the same as those of the bus bar module 102 of Embodiment 2. Thus, the same reference numerals are given to the equivalent parts, so that description thereof will be omitted.

Accordingly, it is possible to get a large insulation creepage distance between the bus bars, even if the filling efficiency of the encapsulation resin 30 is insufficient around the outer peripheral portion. This is effective in making it possible to keep the bus bar module excellent in insulation performance. Moreover, when the protrusion portions 2c, 2d located on the bus bar 1a-side and on the bus bar 1b-side, have vertically symmetrical shapes and dimensions, it is possible to suppress unbalance leading to warpage from occurring. This is effective in making it possible to further mitigate the stress concentration.

As described above, according to the bus bar module 105 of Embodiment 5, in the spacer 2, the protrusion portion 2c that covers the end portion 11e of the bus bar 1a with respect to the parallel planar region 11e, and the protrusion portion 2d that covers the end portion 11f of the bus bar 1b with respect to the parallel planar region 11d, are provided at the outer peripheral portions of the spacer 2. Thus, it is possible to get a large insulation creepage distance between the bus bars, even if the filling efficiency of the encapsulation resin is insufficient around the outer peripheral portion. This is effective in making it possible to keep the bus bar module excellent in insulation performance. Furthermore, when these protrusion portions have vertically symmetrical shapes and dimensions, it is possible to suppress unbalance leading to warpage from occurring. This is effective in making it possible to further mitigate the stress concentration.

It is noted that, in the foregoing Embodiments, each of the through-holes 20H, 21H, 22H, 23H and 24H in the figures has a circular shape; however, this is not limitative. It may have an elliptical shape or any given shape. Further, the description has been made assuming that the number of the bus bars 1a, 2b is two; however, three or more multiple bus bars may instead be provided.

Further, it has been assumed that, in order to ensure insulation between bus bars, the spacer 2 is placed so as to entirely cover the parallel planar regions 11c, 11d; however, the parallel planar regions may be partly uncovered by the spacer 2 to the extent that the insulation is not affected. Furthermore, it has been assumed that the bus bars 1a, 1b and the spacer 2, other than the terminal portions 11a, 11b of the bus bars 1a, 1b, are entirely covered with the resin mold 3 made of an insulating material; however, they may be partly exposed from the resin mold 3 to the extent that the insulation is not affected.

In this application, a variety of exemplary embodiments and examples are described; however, every characteristic, configuration or function that is described in one or more embodiments, is not limited to being applied to a specific embodiment, and may be applied singularly or in any of various combinations thereof to another embodiment. Accordingly, an infinite number of modified examples that are not exemplified here are supposed within the technical scope disclosed in the present description. For example, such cases shall be included where at least one configuration element is modified; where at least one configuration element is added or omitted; and furthermore, where at least one configuration element is extracted and combined with a configuration element of another embodiment.

DESCRIPTION OF REFERENCE NUMERALS AND SIGNS 1a, 1b; bus bar, 2: spacer, 2a, 2b, 2c, 2d; protrusion portion, 2za, 2zb, 11za, 11zb: counterbore portion, 3: resin mold, 11c, 11d: parallel planar region, 20a, 20b, 20h, 21a, 21b, 21h, 22a, 22b, 22h, 23a, 23b, 23h, 24a, 24b, 24h: hole, 20H, 21K, 22H, 23H, 24H: through-hole, 101, 102, 103, 104, 105: bus bar module.

The invention claimed is:

1. A bus bar module, comprising:
a first bus bar having a first hole in a planar region thereof and made of an electrically conductive material;
a second bus bar opposed to the first bus bar, having a second hole in a planar region thereof and at a position corresponding to the first hole, and made of an electrically conductive material;
a spacer made of an insulating material, which is sandwiched between the first bus bar and the second bus bar, and in which a third hole is provided so as to overlap with the first hole and the second hole, and a resin covering the first bus bar, the second bus bar and the spacer;
wherein a first through-hole that is established by the first hole, the second hole and the third hole, is filled with a portion of the resin, and
wherein the spacer is provided with a first counterbore portion at a first circumferential edge portion around the third hole such that the first counterbore portion overlaps with a circumferential edge portion of the first bus bar around the first hole.

2. The bus bar module according to claim 1, wherein the spacer is provided with a first protrusion portion at the first circumferential edge portion around the third hole being located on a side nearer to the first bus bar than the second bus bar, said first protrusion portion covering an inner wall of the first hole.

3. The bus bar module according to claim 1, wherein the spacer is provided with a second protrusion portion at a second circumferential edge portion around the third hole being located on a side nearer to the second bus bar than the first bus bar, said second protrusion portion covering an inner wall of the second hole.

4. The bus bar module according to claim 2, wherein the spacer is provided with a second protrusion portion at a second circumferential edge portion around the third hole being located on a side nearer to the second bus bar than the first bus bar, said second protrusion portion covering an inner wall of the second hole.

5. The bus bar module according to claim 4, wherein the first protrusion portion and the second protrusion portion of the spacer are plane symmetrical with respect to a plane passing through a thickness-direction center of the spacer.

6. The bus bar module according to claim 4, wherein the spacer is provided with a third protrusion portion at a first outer peripheral portion that covers an end portion of the first bus bar with respect to the planar region thereof and a fourth protrusion portion at a second outer peripheral portion that covers an end portion of the second bus bar with respect to the planar region thereof.

7. The bus bar module according to claim 5, wherein the spacer is provided with a third protrusion portion at a first outer peripheral portion that covers an end portion of the first bus bar with respect to the planar region thereof and a fourth protrusion portion at a second outer peripheral portion that covers an end portion of the second bus bar with respect to the planar region thereof.

8. The bus bar module according to claim 1, wherein the spacer is provided with a second counterbore portion at a second circumferential edge portion around the third hole such that the second counterbore portion overlaps with a circumferential edge portion of the second bus bar around the second hole.

9. The bus bar module according to claim 1, wherein the first bus bar is provided with a third counterbore portion at the circumferential edge portion of the first bus bar around the first hole,
wherein the second bus bar is provided with a fourth counterbore portion at a circumferential edge portion of the second bus bar around the second hole, and
wherein said third counterbore portion and said fourth counterbore portion are provided so as to overlap with the first circumferential edge portion of the spacer.

10. The bus bar module according to claim 8, wherein the first bus bar is provided with a third counterbore portion at the circumferential edge portion of the first bus bar around the first hole,
wherein the second bus bar is provided with a fourth counterbore portion at the circumferential edge portion of the second bus bar around the second hole, and
wherein said third counterbore portion and said fourth counterbore portion are provided so as to overlap with the first circumferential edge portion and the second circumferential edge portion of the spacer.

11. The bus bar module according to claim 1, wherein at least one second through-hole that is substantially the same as the first through-hole is provided.

12. The bus bar module according to claim 8, wherein at least one second through-hole that is substantially similar to the first through-hole is provided.

13. The bus bar module according to claim 1, wherein a thickness of the first bus bar is equal to a thickness of the second bus bar, and a thickness of a portion of the resin located on the first bus bar is equal to a thickness of a portion of the resin located on the second bus bar.

14. The bus bar module according to claim 8, wherein a thickness of the first bus bar is equal to a thickness of the second bus bar, and a thickness of a portion of the resin located on the first bus bar is equal to a thickness of a portion of the resin located on the second bus bar.

15. The bus bar module according to claim 1, wherein the spacer is made of Poly Phenylene Sulfide (PPS) or Poly Butylene Terephthalate (PBT).

16. The bus bar module according to claim 8, wherein the spacer is made of Poly Phenylene Sulfide (PPS) or Poly Butylene Terephthalate (PBT).

17. The bus bar module according to claim 1, wherein the spacer has a thickness that is not less than 1 mm and not more than 1.5 mm.

18. The bus bar module according to claim 8, wherein the spacer has a thickness that is not less than 1 mm and not more than 1.5 mm.

19. A bus bar module, comprising:
a first bus bar having a first hole in a planar region thereof and made of an electrically conductive material;
a second bus bar opposed to the first bus bar, having a second hole in a planar region thereof and at a position corresponding to the first hole, and made of an electrically conductive material;
a spacer made of an insulating material, which is sandwiched between the first bus bar and the second bus bar, and in which a third hole is provided so as to overlap with the first hole and the second hole, and
a resin covering the first bus bar, the second bus bar and the spacer;
wherein a first through-hole that is established by the first hole, the second hole and the third hole, is filled with a portion of the resin,
wherein the spacer is provided with a first counterbore portion at a first circumferential edge portion around the third hole such that the first counterbore portion overlaps with a circumferential edge portion of the first bus bar around the first hole, and
wherein the spacer is provided with a second counterbore portion at a second circumferential edge portion around the third hole such that the second counterbore portion overlaps with a circumferential edge portion of the second bus bar around the second hole.

20. A bus bar module, comprising:
a first bus bar having a first hole in a planar region thereof and made of an electrically conductive material;
a second bus bar opposed to the first bus bar, having a second hole in a planar region thereof and at a position corresponding to the first hole, and made of an electrically conductive material;

a spacer made of an insulating material, which is sandwiched between the first bus bar and the second bus bar, and in which a third hole is provided so as to overlap with the first hole and the second hole; and a resin covering the first bus bar, the second bus bar and the spacer, wherein a first through-hole that is established by the first hole, the second hole and the third hole, is filled with a portion of the resin, wherein the spacer is provided with a first counterbore portion at a first circumferential edge portion around the third hole such that the first counterbore portion overlaps with a circumferential edge portion of the first bus bar around the first hole, and wherein a thickness of the first bus bar is equal to a thickness of the second bus bar, and a thickness of a portion of the resin located on the first bus bar is equal to a thickness of a portion of the resin located on the second bus bar.

* * * * *